Figure 1:
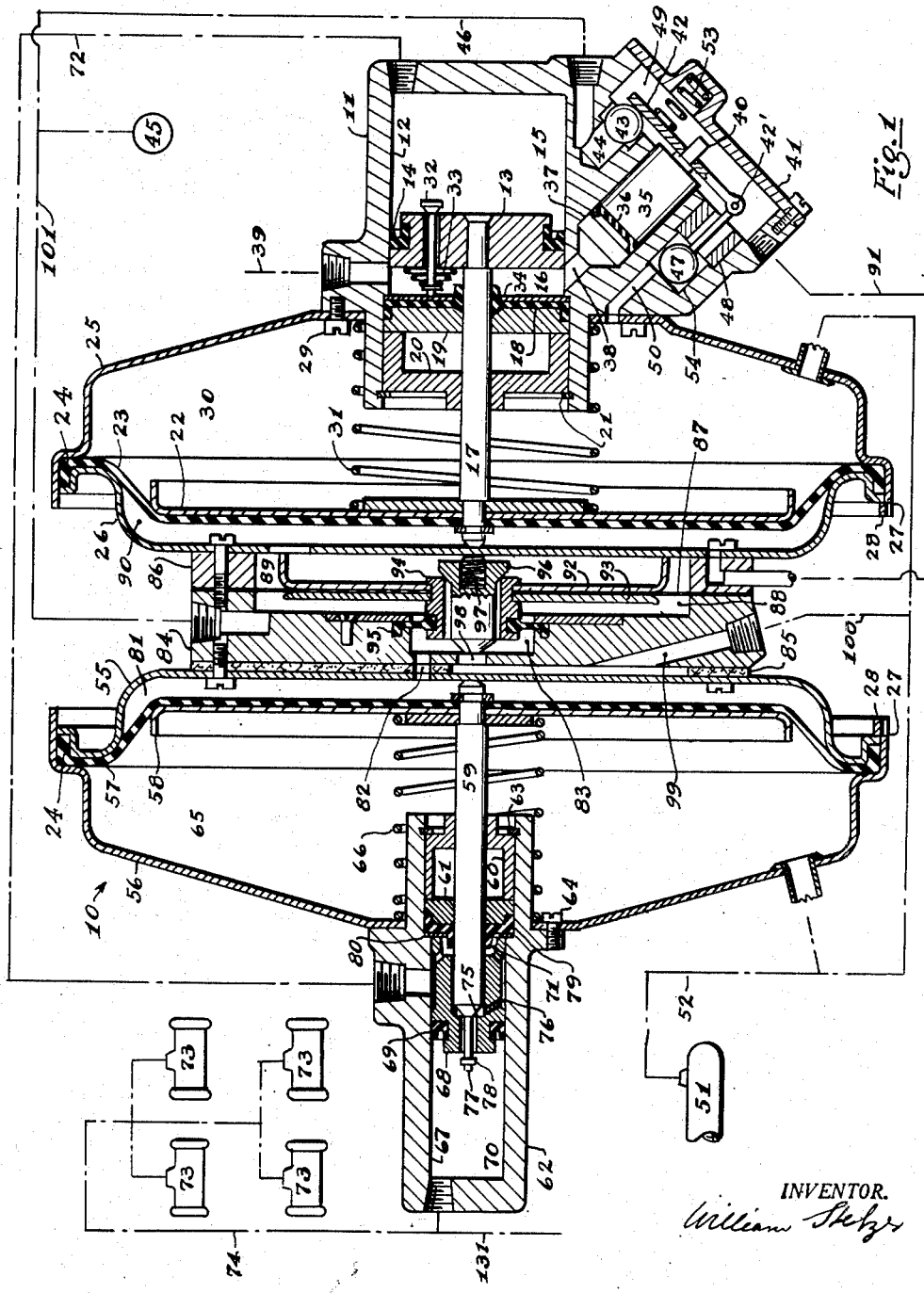

April 5, 1955 W. STELZER 2,705,402
BOOSTER BRAKE MECHANISM
Filed June 14, 1949 2 Sheets-Sheet 1

INVENTOR.
William Stelzer

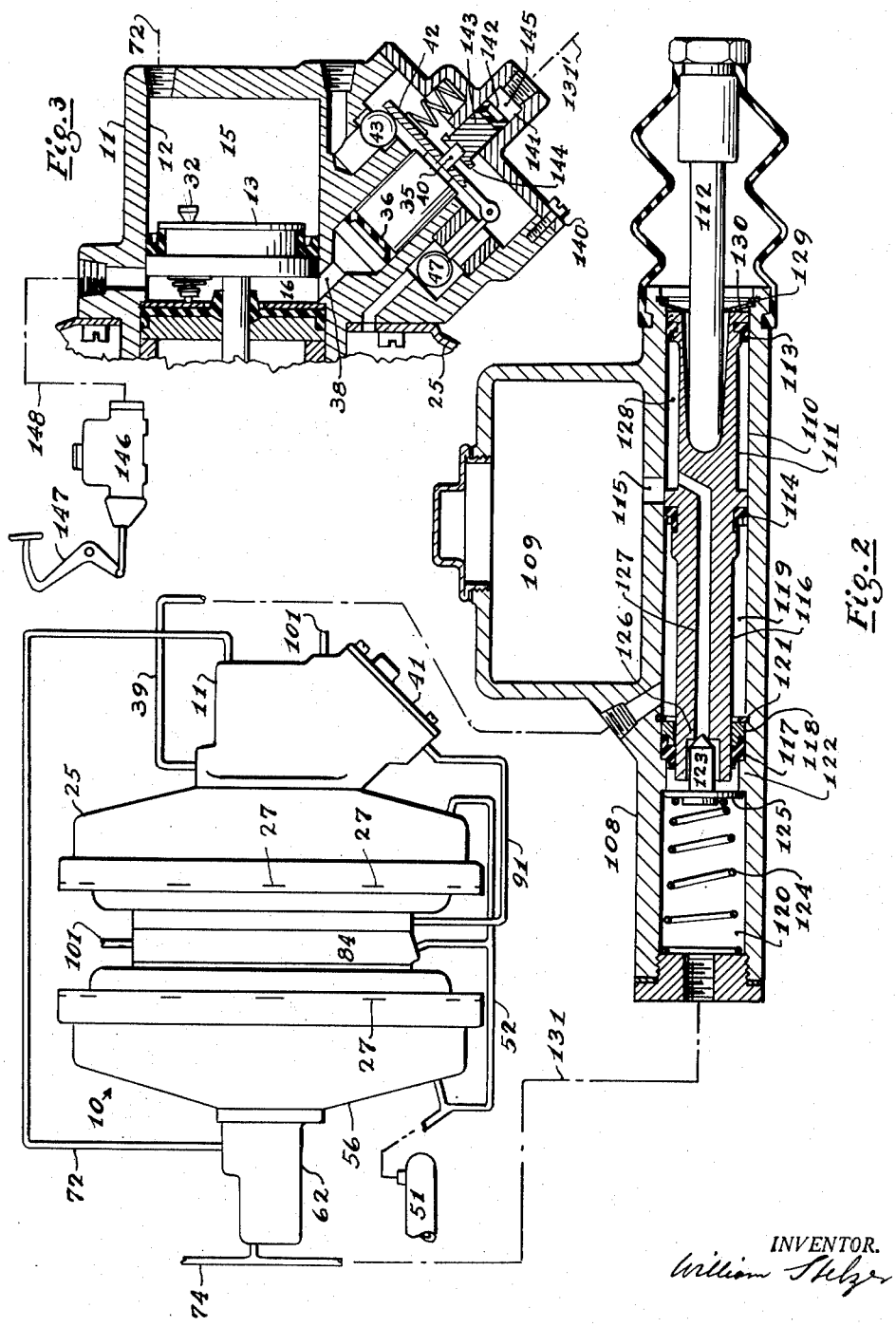

United States Patent Office 2,705,402
Patented Apr. 5, 1955

2,705,402

BOOSTER BRAKE MECHANISM

William Stelzer, Summit, N. J.

Application June 14, 1949, Serial No. 99,002

11 Claims. (Cl. 60—54.5)

This invention relates to a hydraulic booster brake mechanism and more particularly to a hydraulic brake system using a compound or two-stage booster.

The use of compound or two-stage boosters is very desirable because they are more compact and smaller for a given output, the principle being to use a large volume, low pressure fluid displacing means for the first stage to move the brake shoes against the drum, and a small volume, high pressure fluid displacing means for the second stage to simply increase the pressure of the shoes against the drum. The usual way for switching over from one stage to the other is through some device responsive to the hydraulic pressure, the only trouble being the sudden change in reaction either during the applying or releasing operation of the brakes.

Two-stage master cylinders and two-stage boosters are already known to the art, but these have certain disadvantages; the major one being that the transition between the first stage and the second stage is too abrupt so that an annoying lump can be felt by the driver through the brake pedal. This reaction is commonly caused by the sudden change in power requirement when switching over to a cylinder of different diameter.

The object of the present invention is to maintain the inherent advantages of the two-stage system, but to fully eliminate any undesirable reaction on the brake pedal or any fluctuation in the booster ratio during the application as well as during release of the brakes, by providing low pressure and high pressure displacing means, or pumps, and independent motor mechanism for each.

Another object is to provide a relay adapted to energize the motor mechanism of the high pressure pump when the power of the motor mechanism of the low pressure pump becomes insufficient, the actuation of the high pressure pump being effected only to the extent to augment the low pressure pump and adjusting itself equally well in the releasing operation during the transition from the high pressure range to the low pressure range.

Other objects and advantages of this invention will be apparent from the following description considered in connection with the accompanying drawings submitted for the purpose of illustration and not to define the scope of the invention, reference being had for that purpose to the subjoined claims. In the drawings, wherein similar reference characters refer to similar parts:

Fig. 1 is a diagram of the novel system showing a sectional elevation of the booster unit;

Fig. 2, a diagram showing a sectional elevation of the master cylinder and an elevation of the booster unit drawn at a reduced scale; and Fig. 3, a fragmentary sectional elevation of one end of the booster unit showing a modification.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

Numeral 10 designates the booster unit as a whole, where the right half is a low pressure pump or fluid displacing means and motor, and the left half is a high pressure pump and motor.

Referring now to Fig. 1, the low pressure pump or fluid displacing means comprises a cylinder body 11 having a bore 12 in which slides a piston 13 with a seal 14 to divide the cylinder into chambers 15 and 16. The piston rod 17 attached to the piston passes through an end seal 18 and bearings 19 and 20 retained by ring 21 and carries at its other extremity a piston plate 22 and diaphragm 23 whose peripheral bead 24 is clamped between casings 25 and 26 which constitute the housing for the motor mechanism. To hold the two casings together, casing 25 is sheared or slotted at 27, and the outer portion or narrow strip 28 is bent inwardly a short distance to overlap the outer edge of the rim of casing 26 to form a lip. The number of lips required depends largely on the type of power employed, in the case of atmospheric pressure and vacuum there are never any substantial forces tending to separate the two casings, but where a pressure above atmospheric is used as a source of power, a greater number of lips is required to provide sufficient strength. The cylinder body 11 is secured to the motor mechanism by means of screws or bolts 29, one end of the cylinder extending into chamber 30 of the motor mechanism to serve as a pilot for the return spring 31 which urges the pistons of the pump and motor into the starting or "off" position. In this position, which is the one shown on the drawings, communication is provided between chambers 15 and 16 by means of a valve 32 ordinarily urged into a seated position by a tapered spring 33, but held open by a metal disc 34 also serving as a retainer for seal 18. Control of the motor mechanism is effected by a pressure responsive element consisting of a plunger 35 and seal 36 sliding in bore 37 and acted upon by the hydraulic pressure of the fluid in chamber 16 communicating through hole 38. A fluid transmitting line 39 is leading to the master cylinder which will be described later. Movement of plunger 35 is limited to a short distance by a central extension 40 when the latter abuts the inside face of cover 41 secured to body 11. The short movement is transmitted to a beam 42 adapted to rock on the shoulder of extension 40. One end of beam 42 contacts valve ball 43 closing off passage 44 connected to a source of pressure 45 through line 46. The source of pressure may be compressed air or any other fluid under pressure, or it may be merely the atmosphere. The other end of beam 42 is pivotally connected at 42' to the stem of a valve 47 which in the starting or "off" position is lifted from its seat 48 so that communication is established between chamber 49, via passage 50, and chamber 30, the latter being permanently connected to a source of low pressure 51 through line 52. The source of low pressure may be vacuum as obtained from the intake manifold of an engine, or, if compressed air is used as a source of power, the source of low pressure may simply be the atmosphere. A valve spring 53 engages beam 42 intermediate extension 40 and pressure valve 43 to urge the latter into closed position and low pressure valve 47 into open position where the top of its spherical head rests against the bottom of the bore 54 in which the head is confined.

The motor mechanism for the high pressure pump is very similar to the one already described. It has two casings 55 and 56 between which is clamped a diaphragm 57 acting on central reinforced piston plate 58 attached to a piston rod 59 sliding in bearings 60 and 61 secured to cylinder or pump body 62 by means of retaining ring 63. The pump body is secured to casing 56 as with screws or bolts 64, whereby one end of the body extends into chamber 65 of the motor mechanism to serve as a pilot for return spring 66 urging the piston plate and diaphragm into the "off" or starting position, as shown. A central bore 67 accommodates a sliding piston 68 provided with a seal 69 to divide the cylinder into chambers 70 and 71, the latter being in permanent communication with chamber 15 of the low pressure pump through line 72, and high pressure chamber 70 being connected with the wheel cylinders 73 through line 74. Piston 68 has a bore in which one end of rod 59 slides, the latter having a tapered end to engage valve seat 75 through which the piston rod pushes the piston when the unit is in operation. In the released position this valve is open so that communication is established between chambers 70 and 71 through hole 76. An extension 77 and split collar on ring 78 serve to confine the piston to a limited movement in relation with the piston rod. 79 is a seal and 80 a retaining washer against which piston 68 stops.

Chamber 65 of the motor mechanism is connected to the source of low pressure 51 while chamber 81 is in communication via passage 82 with valve chamber 83 of a relay which is located intermediate the two motor mechanisms. The relay comprises a body 84 bolted to casing 55 with a heavy gasket 85 interposed. It is also bolted to casing 26 through spacer 86 and diaphragm 87 which divides the space between body 84 and casing 26 into chambers 88 and 89, the latter being open to chamber 90 of the first stage motor mechanism and therefore in communication with valve chamber 49 through line 91. The diaphragm 87 is firmly held between two piston plates 92 and 93 secured to a floating hub-like valve seat 94, chamber 88 being sealed off from chamber 83 by a flexible seal 95 whose outer bead is clamped to body 84 and the inner bead fitting firmly into a circular groove of seat member 94. Within the central bore of seat 94 is a double valve 96 urged into a closed position by a light spring 97. The smaller tapered end of valve 96 is arranged to engage the valve seat formed by hole 98 to control the passage between chamber 83 and source of vacuum or low pressure 51 through hole 99 and line 100 an open space being formed by gasket 85 between body 84 and casing 55 which open space connects holes 98 and 99. Chamber 88 is connected to the source of pressure 45 by means of line 101. If atmospheric pressure is used, chamber 88 can simply be vented to the atmosphere, and line 101 can be dispensed with.

The two-stage booster construction is here applied to an improved hydraulic braking system which is disclosed in a co-pending application. The improved system employs a special type of master cylinder where a small amount of fluid under higher pressure is transmitted by manual power directly to the wheel cylinders, and a larger amount of fluid is transmitted to the booster whose function it is to transmit an equal or proportionate amount of fluid as received to the wheel cylinders. The novel master cylinder is shown in Fig. 2, where 108 is the cylinder body with a fluid reservoir 109 and a cylinder bore 110 in which slides piston 111 engaged by push rod 112 operated by the brake pedal, not shown. The piston has seals 113 and 114, whereby the chamber between the two seals is always open to the reservoir 109 through hole 115. The free end 116 of piston 111 is reduced in diameter to serve as a high pressure plunger passing through seal 117 backed by bearing 118. The latter has sufficient clearance with plunger 116 to allow fluid to pass from chamber 119 to chamber 120 through the clearance and past the lip of seal 117. The seal and the bearing are held between a snap ring 121 and a shoulder 122 also serving as a stop for valve 123 urged into a closed position by return spring 124 acting against disc 125 which is part of the valve. A valve seat is provided at 126, and a hole 127 leads to chamber 128 so that chamber 120 is in communication with the reservoir 109 when valve 123 is open. The retractile movement of piston 111 is limited by a snap ring 129 and by a spring washer 130 interposed between ring 129 and piston 111. The purpose of spring washer 130 is to impart the function of a residual valve to valve 123. In the starting, or released position, any pressure above the desired residual pressure in chamber 120 acting on piston 111, forces the latter towards retaining ring 129 while compressing spring 130, thus opening valve 123 arrested by shoulder 122, to allow relief of pressure in chamber 120 through passage 127 into the reservoir. As soon as the excessive pressure is relieved spring 130 closes the valve again. High pressure chamber 120 is connected with the high pressure pump and with the wheel cylinders through a pipe line 131, and chamber 119 is connected to chamber 16 of the low pressure pump through line 39.

It is apparent that the invention is applicable not only to the novel system shown, but also to the older systems using a conventional master cylinder. Such an application is illustrated in the modification shown in Fig. 3. The entire booster unit is the same as in Fig. 1 with the exception of additional means responsive to the boosted or wheel cylinder pressure to oppose the pressure responsive means 35 and 36. Cover 41 is thus replaced by a cover 140 having a bore 141 in which slide a seal 142 and piston 143 engaging extension 40. A shoulder 144 limits the movement of the control pistons in response to fluid pressure in chamber 16. Chamber 145, where the fluid acts on seal 142, is connected to line 131 through line 131', the master cylinder in Fig. 2 being dispensed with and in its place a conventional master cylinder 145 being used, where 147 designates the brake pedal. Thus line 131 leads to chamber 145 and not to the master cylinder. The only line from the master cylinder is 148 connected to chamber 16 of the low pressure pump in place of line 39. All other connections are the same so that it does not need to be further described.

Considering now the operation, Figs. 1 and 2 show the released or starting position. For simplicity in description it is here assumed that the source of pressure 45 is the atmosphere, and the source of low pressure 51 is vacuum. Thus atmospheric pressure exists in chamber 88 of the relay, and all chambers of the motors are open to vacuum so that no pressure is exerted on the diaphragm pistons except by the return springs. Since vacuum exists in chamber 90, the same low pressure affects chamber 89 so that diaphragm piston 92 is forced to the right by the air pressure in chamber 88, movement being prevented by the outer flange of plate 92 which rests against casing 26. Inspecting now the hydraulic circuit, it will be observed that the valves in the pistons of both pumps are open, so that the hydraulic circuit between wheel cylinders 73 and chambers 119 and 120 of the master cylinder is open. In the manual actuation of the master cylinder when the operator depresses the brake pedal and piston 111 moves toward the left, fluid is displaced in chambers 119 and 120, the fluid displaced in both chambers thus being free to flow to the wheel cylinders to apply the brakes. Spring 53 is so proportioned that a small rise in hydraulic pressure acting on piston 35 and seal 36 causes the spring to yield so that valve 47 is being closed, beam 42 rocking on valve ball 43. When valve 47 is closed, further movement of piston 35 causes beam 42 to swing about the pivot point 42' to allow valve ball 43 to open so that air from the atmosphere is permitted to enter through chamber 44 into chamber 49 from where the air is transmitted through line 91 to chamber 90 of the motor mechanism, acting on diaphragm 23 to push piston rod 17 and piston 13 toward the right, whereby valve 32 becomes seated, so that fluid is displaced from chamber 15 to be transmitted thru line 72 to chamber 71, from there through the open valve into chamber 70 and via line 74 to the wheel cylinders 73. Since in the initial stage very little pressure is required to apply the brakes, the pressure difference between chambers 90 and 30 is very small, consequently the pressure difference between the two sides of the relay diaphragm, chambers 88 and 89, is still very great so that no change takes place and the motor for the high pressure pump remains de-energized. Thus in the low pressure stage the unit acts as a single booster, however, as the pressure is increased to a certain point where the power requirement nears the maximum, i. e., where the pressure in chamber 90 reaches atmospheric pressure after which it cannot be further increased, it is necessary that the second stage come into play where a higher power ratio produces a higher output pressure, though with a smaller displacement. This condition of the motor of the low pressure pump, where a full power is reached and cannot be further increased, is commonly known in the industry as "power runout," which is equivalent to the attainment of maximum power or pressure which can be supplied by the source 45. The energization of the motor for the high pressure pump is performed by the relay where the pressures in chambers 88 and 89 are becoming more nearly equal. Due to the existence of vacuum pressure in chamber 83 the forces opposing each other in chambers 88 and 89 become balanced before chambers 90 and 89 reach atmospheric pressure. This balance of pressure is thus reached when the difference in air pressure in chambers 88 and 89 is about three inches of mercury. As soon as the air pressure in chamber 90 rises slightly higher, or in terms of vacuum, falls below three inches of mercury, the diaphragm piston and valve seat 94 move towards the left so that the smaller end of valve 96 becomes seated to close off hole 98, thereby valve 96 becomes arrested and further movement of the diaphragm piston towards the left unseats valve 96 from seat 94 to allow air from chambers 89 and 90 to flow into chamber 83 and through hole 82 into chamber 81 to put the motor mechanism for the high pressure pump into motion. The initial movement of piston rod 59 closes the valve at 75 and picks up piston 68 to displace fluid from chamber 70 to the wheel cylinders. In the meantime chamber 71 becomes larger and therefore draws fluid from the low pressure pump through line 72. This fluid is under pressure and thus assists the high pressure pump. Since fluid is displaced from chamber 15 piston 13 has moved a short distance and fluid is drawn from chamber 119 of the master cylinder. The entire performance is subordinate to the movement of the master cylinder where the displacement of the booster is commensurate with the amount of fluid displaced from chamber 119 of the master cylinder. Thus if the holding position is reached where the brake pedal is not further depressed, any further movement of the booster will immediately cause a drop in the pressure in chamber 16, followed by a return of piston 35 in response to spring 53, thus first closing pressure valve 43 to stop any further increase in power so that the booster will be arrested. The characteristic of the relay is to tend to maintain a certain pressure in chamber 90, as mentioned before, the pressure at the point of cut-in of the high pressure pump is approximately three inches below atmospheric pressure (in the case of vacuum power and atmospheric pressure). As soon as this difference is reduced, power is admitted to the motor mechanism for the high pressure pump, causing the displacement of fluid from the high pressure pump to the wheel cylinders. This action causes a reduction in the pressure of the control fluid in chamber 16, so as to stop any further admission of air to chamber 90, or to open valve 47 so as to reduce the pressure in chamber 90, which action in turn would cause the relay valve to stop further admission of air to chamber 81, or, with further reduction of air pressure in chamber 90, to reduce the pressure again in chamber 81. It would be considered very undesirable to permit the valves to hunt, or to allow a condition where the relay would increase the power of the motor for the high pressure pump, while the booster valves would reduce the power of the motor mechanism for the low pressure pump. Actually, this danger does not exist with the construction shown, first, because the follow-up action is immediate, and second, because the booster valves as well as the relay valve are preloaded in such a way that a certain pressure differential has to be overcome. Thus for instance between the opening or closing of valve 47 and 43 there must occur a pressure rise or fall of 10 p. s. i. or more in chamber 15. A similar holding action occurs in the relay valve. A further stabilizing factor is obtained by the movement of diaphragm 23 where during the application stroke any transfer of air by the relay to chamber 81 and consequent displacement of fluid from chamber 70 is accomplished by a movement of diaphragm 23 away from casing 26, which, besides the transfer of air from chamber 90 to chamber 81, automatically reduces the pressure in chamber 90 through expansion, and in turn causes the relay to shut off the air supply to chamber 81. While the relay at the beginning of the second stage tends to maintain a pressure in chamber 90 as stated, when the output pressure of the high pressure pump has been considerably increased where the air in chamber 81 also approaches atmospheric pressure, the relay tends to maintain a pressure in chamber 90 that is more nearly atmospheric. Thus the pressure differential between chambers 90 and 88 decreases in the second stage with the gradual increase in output pressure of the pump.

Supposing now that the operator releases the brake pedal to start the retractile movement, the immediate reduction of pressure in chamber 119 causes plunger 35 to move upwardly to close air valve 43 and to open vacuum valve 47, which reduces the air pressure in chamber 90. As a result the relay closes valve 96 on seat 94 and lifts it from hole 98 so that chamber 81 is evacuated through hole 82, chamber 83, valve opening 98, lines 100 and 52 and source of vacuum 51. The released air may also flow into chambers 30 and 65. Pistons 58 and 68 are returned to the starting position by the force of the hydraulic pressure from the wheel cylinders and by spring 66. When the starting position is approached the hydraulic pressure in chamber 70 has been gradually reduced during the return stroke until it is the same as the pressure in chamber 15, because at this point the cut-in had occurred during the brake application. Thus as the starting position is reached by piston 68, it comes to rest against washer 80 while piston rod 59 and diaphragm plate continue a short distance by force of spring 66 and the hydraulic pressure acting on piston rod 59, to open the passage at 75 to establish a direct communication between the wheel cylinders and chamber 15, the pressure in chamber 81 by this time being equal to that in chamber 65. During the retractile movement of piston 68, piston 13 also moved towards its starting point to make up for the fluid it received from chamber 71. After the high pressure pump is inoperative and by-passed, the return of piston 13 and diaphragm 23 is the same as in a conventional booster, the speed depending on the speed of the retractile movement of the master cylinder and the effectiveness of the control valves. When piston 13 reaches the "off" position, valve 32 is lifted from its seat so that communication is established between chambers 15 and 16. As the master cylinder in Fig. 2 reaches its released position, valve 123 comes to rest against shoulder 122 whereby any excess pressure can relieve itself through passage 127, a residual pressure being maintained as described before.

The operation of the modification in Fig. 3 is substantially the same as described for Fig. 1, the exception being only the method of actuating the control valves. Master cylinder 146 produces a primary pressure which is communicated to chamber 16 and through passage 38 to act on piston 35 to close the vacuum valve 47 and open air valve 43 to energize the motor mechanism for the low pressure pump. The boosted pressure is transmitted through line 72 past piston 68, through chamber 70 and line 74 to the wheel cylinders, the boosted pressure being also transmitted through line 131 into chamber 145 to act on plunger 143 to oppose plunger 35. The ratio of the areas of plungers 35 and 143 is the same as the booster ratio, when neglecting the influence of valve spring 53.

In this embodiment, shown in Fig. 3, valve 32 is an essential element, but it may be observed that it could be dispensed with in the construction in Fig. 1 where a master cylinder as shown in Fig. 2 is used, since in the released position fluid from chamber 15 can return through line 72, past piston 68 through line 131, into chamber 120, from where excessive pressure is relieved through valve 123. The control fluid in chambers 16 and 119 can be relieved of excessive pressure by passage through the clearance between plunger 116 and bearing 118 and past the lip of cup 117 into chamber 120, and also through valve 123 to the reservoir.

The two embodiments have been chosen to illustrate that different types of boosters and control principles may be used without changing the scope of the invention. It should also be understood that the arrangement of the low pressure unit with respect to the high pressure unit does not affect the principle of the invention, nor does the type of motor mechanism or pump.

Having thus described my invention, I claim:

1. In a booster for a hydraulic braking system, low pressure large volume hydraulic fluid displacing means, a motor connected to operate said low pressure hydraulic fluid displacing means, a source of power for said motor, a control means connected to said source and to said motor for controlling energization of said motor, high pressure hydraulic fluid displacing means having a connection for receiving hydraulic fluid displaced by said low pressure hydraulic fluid displacing means and a connection for transmitting said hydraulic fluid to said braking system, a second motor connected to operate said high pressure hydraulic fluid displacing means, and means responsive to energization of said first-named motor and operative upon predetermined energization thereof to energize said second motor.

2. In a booster for a hydraulic braking system, a pair of differential fluid pressure operated motors each having a pressure movable member dividing it into a pair of chambers one of which is a variable pressure chamber, a low pressure high volume hydraulic fluid displacing device connected to the pressure movable member of one of said motors, means for supplying hydraulic fluid to said displacing device, a high pressure low volume hydraulic fluid displacing device connected to the pressure movable member of the other motor, hydraulic fluid transmitting lines connected between said low pressure displacing device and said high pressure displacing device and from the latter device to the braking system, a source of fluid pressure higher than the pressure in the other motor chambers, valve mechanism connected between said source and said one motor for controlling the energization thereof, relay valve means normally closing communication between the variable pressure chambers of said motors, and means subject to differential pressures in said one motor and operative when such differential pressures reach a predetermined point for opening said relay valve means to establish communication between the variable pressure chambers of said motors.

3. Apparatus constructed in accordance with claim 2 wherein the means for opening said relay valve means comprises a pressure responsive member having opposite sides thereof subject respectively to pressure in said source and pressure in the variable pressure chamber of said one motor.

4. Apparatus constructed in accordance with claim 2 wherein said relay valve means is normally biased to a position connecting the chambers of said second motor to balance pressures therein, the means for operating said relay valve means comprising a pressure responsive member having opposite sides subject respectively to the pressure in said source and to pressure in the variable pressure chamber of said first motor whereby, when such pressures approach equalization, said relay valve means will be operated to disconnect from each other the chambers of said second motor and to connect the variable pressure chambers of the two motors.

5. In a booster for a hydraulic braking system, a low pressure hydraulic pump, a differential fluid pressure operated motor connected to operate said low pressure pump, a high pressure hydraulic pump having connections to receive hydraulic fluid from said low pressure pump and to transmit such hydraulic fluid at a higher pressure, a second differential fluid pressure operated motor connected to operate said high pressure hydraulic pump, and a relay mechanism having connections to both of said motors and responsive to predetermined differential pressure in said first-named motor to energize said second named motor.

6. In a booster for a hydraulic braking system, a large volume low pressure hydraulic pump, a differential fluid pressure operated motor connected to operate said pump, a power operated small volume high pressure hydraulic pump having connections to receive hydraulic fluid from said low pressure pump and to boost the pressure of such fluid, and a relay mechanism connected to said motor and to said power operated pump and responsive to predetermined differential pressures in said motor to energize said high pressure pump to boost the pressure of the hydraulic fluid received from said low pressure pump.

7. In a booster for a hydraulic braking system, a master cylinder operated by the operator and wheel cylinders to operate the brakes, a high volume low pressure hydraulic pump having connections to receive fluid from said master cylinder and transmit it under pressure to said wheel cylinders, a first differential fluid pressure operated motor connected to operate said pump, control means for said motor having connections to receive fluid displaced from said master cylinder to control differential pressures in said motor, a low volume high pressure hydraulic pump having connections to receive fluid from said low pressure pump and to transmit it to said wheel cylinders under an increased pressure, a second differential fluid pressure operated motor connected to operate said high pressure pump, and a relay mechanism having a pressure responsive device subject to the differential pressures affecting said first motor to energize said second motor when said first motor is energized to a predetermined extent.

8. In a booster for a hydraulic braking system, a master cylinder operated by the operator and wheel cylinders to actuate the brakes, a source of fluid pressure, a power operated low pressure large volume hydraulic pump having a connection to receive fluid from said master cylinder, control means for said power operated pump having a connection with said master cylinder to govern the pressure and volume of hydraulic fluid output of said pump in proportion to the volume of hydraulic fluid displaced from said master cylinder, a power operated high pressure low volume hydraulic pump having a connection with said source to be operated by fluid pressure therefrom, and having connections to receive fluid from said low pressure pump and to transmit it under higher pressure to said wheel cylinders, relay valve means connected to said power operated high pressure pump to control energization thereof, pressure sensitive means connected to said relay valve means and responsive to the difference between the pressure in said source and the fluid pressure supplied for the actuation of said power operated low pressure pump to urge said relay valve means to de-energize said power operated high pressure pump, and to energize same when such difference in pressure is reduced to a predetermined point.

9. In a booster for a hydraulic braking system, a high volume low pressure hydraulic pump, a first air pressure motor connected to operate said pump, a source of air pressure, means for controlling the application of pressure from said source to said motor to control the output of said pump, a high pressure low volume pump having connections to receive fluid from said low pressure pump and to boost the pressure of such fluid, a second air pressure motor connected to operate said high pressure pump, a relay mechanism having pressure responsive means responsive to pressure differential between said source and the air pressure supplied for the actuation of said first motor and operative when said pressure differential is above a predetermined point to de-energize said second motor, and means biasing said relay mechanism to an operative position to energize said second motor and operative when said pressure differential drops to a predetermined minimum.

10. The combination as claimed in claim 9 wherein said relay mechanism comprises a valve controlling communication between said motors, said valve being connected to said pressure responsive means to be closed when said pressure differential is above a predetermined point and to be opened when said biasing means becomes effective.

11. In a booster for a hydraulic braking system, a manually operable master cylinder and wheel cylinders to apply the brakes, a low pressure hydraulic pump having connections to receive fluid from said master cylinder, a differential fluid pressure operated motor connected to operate said low pressure pump to boost the pressure of the fluid therein, a source of pressure, control valve means for said motor communicating with the master cylinder to be operated in accordance with fluid displacement therefrom to control the connection of said motor to said source to determine the output volume and pressure of hydraulic fluid from said pump, a high pressure hydraulic pump having connections to receive fluid from said low pressure pump and to transmit it under boosted pressure to said wheel cylinders, a second differential fluid pressure operated motor connected to operate said high pressure pump, control valve means for controlling the energization of said second motor, a pressure sensitive control device responsive to differential pressures in said first named motor to urge the control valve means for said second motor to an inoperative position de-energizing such motor when differential pressures in said first motor are below a predetermined point, and means biasing the control valve means for said second motor to an operative position energizing such motor and movable to such position when differential pressures in said first named motor increase to a predetermined point.

References Cited in the file of this patent
UNITED STATES PATENTS

| 1,812,816 | Weaver | June 30, 1931 |
| 2,032,185 | Sciaky | Feb. 25, 1936 |
| 2,305,638 | Rockwell | Dec. 22, 1942 |
| 2,366,388 | Crosby | Jan. 2, 1945 |
| 2,401,883 | Pugh et al. | June 11, 1946 |
| 2,402,344 | Price | June 18, 1946 |
| 2,404,932 | Stelzer | July 30, 1946 |
| 2,414,158 | Mock | Jan. 14, 1947 |
| 2,486,256 | Buck | Oct. 25, 1949 |
| 2,526,646 | Ericson | Oct. 24, 1950 |